United States Patent [19]

Roushdy et al.

[11] 4,224,838
[45] Sep. 30, 1980

[54] FOUR SPEED RATIO AUTOMATIC TRANSMISSION WITH COMPACT GEARING

[75] Inventors: Hesham A. Roushdy, Birmingham; Daniel H. Hildebrand, Westland, both of Mich.

[73] Assignee: Ford Motor Company, Dearborn, Mich.

[21] Appl. No.: 966,978

[22] Filed: Dec. 6, 1978

[51] Int. Cl.² ............ F16H 47/08; F16H 57/10
[52] U.S. Cl. ............... 74/688; 74/750 R; 74/761; 74/763; 74/769
[58] Field of Search ............ 74/688, 761, 763, 765, 74/769, 750 R, 753

[56] References Cited
U.S. PATENT DOCUMENTS

| 2,478,868 | 8/1949 | Hasbany | 74/763 |
|---|---|---|---|
| 2,478,869 | 8/1949 | Hasbany | 74/763 |
| 2,939,341 | 6/1960 | Evernden | 74/688 X |
| 3,396,606 | 4/1968 | Tuck | 74/688 X |
| 3,507,168 | 4/1970 | Carp | 74/688 |

Primary Examiner—C. J. Husar
Assistant Examiner—Frank McKenzie
Attorney, Agent, or Firm—Donald J. Harrington; Keith L. Zerschling

[57] ABSTRACT

A hydrokinetic, multiple-ratio, automatic transmission having a hydrokinetic unit and compound planetary gearing wherein the gearing elements are arranged in radial disposition, one with respect to the other, to produce a minimum axial transmission dimension, a clutch-and-brake arrangement that can be controlled to produce four forward-driving ratios and a single reverse ratio, the third forward-driving ratio being a split torque drive and the fourth forward-driving ratio being an overdrive, the gearing including two sets of planet pinions that are mounted independently on their respective carriers and clutch structure for connecting the carriers for common rotation during low speed operation and reverse drive operation and for relative motion during operation in the other ratios.

4 Claims, 8 Drawing Figures

| | $CL_1$ | $CL_2$ | $CL_3$ | $CL_4$ | O.W.C. | $B_1$ | $B_2$ | Ratio |
|---|---|---|---|---|---|---|---|---|
| I | X | | | | X | X | | 2.8:1 |
| II | X | | | X | | X | | 1.6:1 |
| III | X | X | | X | | | | 1:1 |
| IV | | X | | X | | | X | .572:1 |
| R | X | | X | | | | X | −2.0:1 |

| | $CL_1$ | $CL_2$ | $CL_3$ | $CL_4$ | O.W.C. | $B_1$ | $B_2$ | Ratio |
|---|---|---|---|---|---|---|---|---|
| I | X | | | | X | X | | 2.8:1 |
| II | X | | | X | | X | | 1.6:1 |
| III | X | X | | X | | | | 1:1 |
| IV | | X | | X | | | X | .572:1 |
| R | X | | X | | | | X | −2.0:1 |

| | CL₁ | CL₂ | CL₃ | CL₄ | O.W.C. | B₁ | B₂ | Ratio |
|---|---|---|---|---|---|---|---|---|
| I | X | | | | X | X | | 2.8:1 |
| II | X | | | X | | X | | 1.6:1 |
| III | X | X | | X | | | | 1:1 |
| IV | | X | | X | | X | | .572:1 |
| R | X | | X | | | | X | -2.0:1 |

| | $CL_1$ | $CL_2$ | $CL_3$ | $CL_4$ | O.W.C. | $B_1$ | $B_2$ | Ratio |
|---|---|---|---|---|---|---|---|---|
| I | X | | | | X | X | | 2.8:1 |
| II | X | | | X | | X | | 1.6:1 |
| III | X | X | | X | | | | 1:1 |
| IV | | X | | X | | | X | .572:1 |
| R | X | | X | | | | X | −2.0:1 |

FOUR SPEED RATIO AUTOMATIC TRANSMISSION WITH COMPACT GEARING

BRIEF DESCRIPTION OF THE INVENTION

My invention comprises improvements in prior art U.S. Pat. Nos. 3,472,412; 3,472,413 and 2,478,868. It is related also to co-pending application Ser. No. 966,979, filed Dec. 6, 1978, which is assigned to the assignee of this invention.

The reference patents show compact gearing arrangements wherein elements of one planetary set are radially disposed with respect to the elements of a companion planetary set in a hydrokinetic transmission mechanism. The gearing elements are capable of establishing three forward-driving ratios and a reverse ratio. The above mentioned co-pending application discloses a four speed ratio version of the gearing arrangement shown in the reference patents. My present invention, like that of the co-pending disclosure, is capable of providing four forward-driving ratios with an extended ratio spread. It provides also an extreme ratio overdrive. A clutch-and-brake arrangement is used to achieve this ratio spread, including the extreme overdrive ratio, as well as the reverse ratio. This arrangement includes clutch structure for controlling the relative motion of independently movable parts of the carrier assembly for the planetary pinions of the compound gearing.

The clutch-and-brake structure for controlling the relative motion of the gear elements is arranged in compact fashion to provide a minimum dimension driveline package for use in a small automotive vehicle. The package is especially adapted for an automotive vehicle in which the torque output element is a final drive gear located between the hydrokinetic unit and the planetary gearing to produce a so-called transaxle drive.

PARTICULAR DESCRIPTION OF THE INVENTION

Figures 1, 1A:
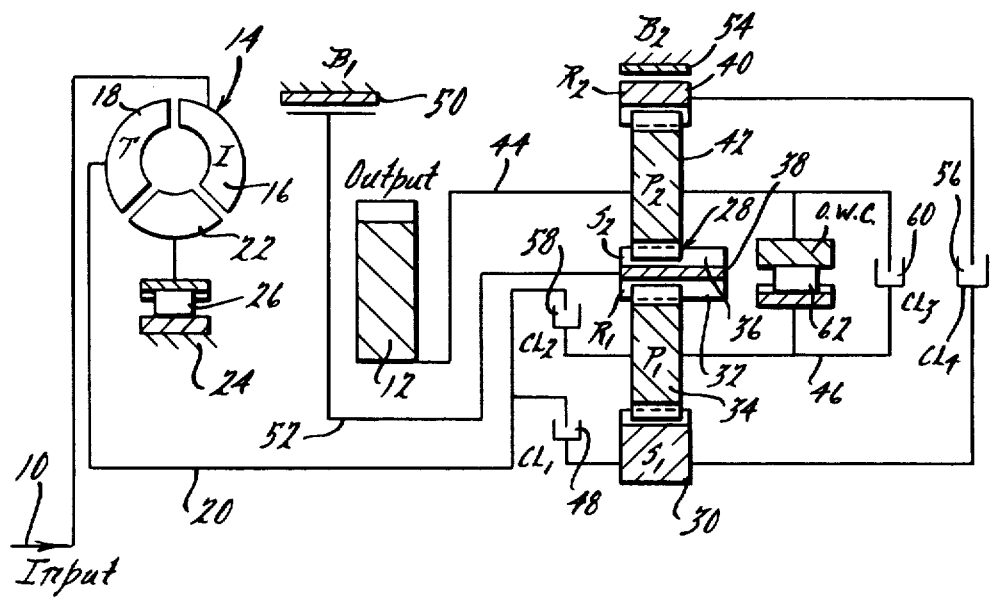
FIG. 1 is a schematic representation of a first embodiment of my invention in which the engine, the hydrokinetic unit and the gearing are arranged in an inline fashion for a conventional driveline arrangement.
FIG. 1A is a chart showing the clutch-and-brake engagement and release pattern for the transmission of FIG. 1.

Numeral 10 in FIG. 1 designates a power input shaft which can be connected to an engine crankshaft of a vehicle. Numeral 12 designates a power output gear which serves as a driven member of the transmission mechanism.

A hydrokinetic torque converter 14 includes an impeller 16 connected through a driveplate to the power input shaft 10 and a turbine 18 connected to turbine shaft 20. A bladed stator 22 is located between the flow exit section of the turbine and the flow entrance section of the impeller and is mounted on a stator sleeve shaft 24. Overrunning brake 26 anchors the impeller 22 against rotation in a direction opposite to the direction of rotation of the impeller but permits freewheeling motion in the direction of rotation of the impeller.

A compact planetary gear system 28 includes two planetary sets arranged in a compound gear system. This includes a first sun gear 30, a first ring gear 32 and a set of planet pinions 34 that engage drivably ring gear 32 and sun gear 30. A second sun gear 36 is formed on the outer periphery of ring 38, which is common to the ring gear 32. The internal teeth of ring gear 32 are formed on the inner periphery of the ring 38.

A second ring gear 40 surrounds the ring 38 and the sun gear 30. A second set of planet pinions 42 engage drivably ring gear 40 and sun gear 36. Pinions 42 are carried by carrier 44 and pinions 34 are carried by the carrier 46. The pinions are mounted on their respective carriers, carrier 42 being connected drivably to output gear 12.

A selectively engageable first clutch 48 is adapted to connect the turbine shaft 20 to the sun gear 30. Clutch 48 is engaged during operation in the first three forward-driving ratios as well as during reverse drive, but it is released during overdrive operation.

A friction brake 50 is selectively engageable to anchor sleeve shaft 52, which in turn is connected to the ring 38 to establish a reaction point during operation of the first speed ratio and the second speed ratio as well as during overdrive operation. Friction brake 54 is selectively engaged to anchor ring gear 40 during reverse drive operation. Ring gear 40 is connected to the sun gear 30 by selectively engageable friction clutch 56 during operation in the third direct-drive ratio and the high speed overdrive ratio as well as during operation in the second underdrive ratio.

Turbine shaft 20 is connected to the carrier 46 through selectively engageable friction clutch 58 during operation in the third direct-drive ratio and the overdrive fourth ratio.

The carriers 44 and 46 are connected together by selectively engageable friction clutch 60 during operation in reverse drive to establish a driving connection between carrier 46 and output gear 12. During operation in the forward-drive low speed ratio torque is transmitted from carrier 46 to carrier 44 through overrunning coupling 62. The carrier freewheels during operation in each of the other forward driving ratios.

During operation in the low-speed ratio, ring gear 32 acts as a reaction point and the sun gear 30 acts as a torque input element. The carrier torque on the carrier 46 is distributed through the overrunning coupling to the output member 12 to produce a driving ratio of 2.8:1. A ratio change to the second speed ratio is accomplished by engaging clutch 56 as the sun gear 28 acts as a reaction point. Torque then is distributed from turbine shaft 20 and through the clutch 48 to the ring gear 40 to produce an overall driving ratio of 1.6:1. Overrunning coupling 62 freewheels.

During operation in the third ratio both clutches 48 and 58 are applied by locking together the elements of the planetary gear system for rotation in unison. Clutch 56 also is applied to establish a 1:1 ratio condition.

The overdrive ratio is achieved by distributing turbine torque through the clutch 58 to the carrier 46; and with the brake 50 applied, ring gear 32 acts as a reaction point. This causes the sun gear 30 to overspeed which in turn drives the ring gear 40 with a resulting overall ratio of the extreme value of 0.572:1.

Brake 54 is applied to establish a reaction point during reverse drive. With the sun gear 30 connected to the turbine shaft 20 through the clutch 48, carrier 46 is caused to drive the carrier 44.

In the FIG. 2 embodiment the torque flow path and mode of operation is identical to that of the FIG. 1 embodiment, but the converter illustrated by reference character 14' is located at an outboard location and is connected to the engine through a central torque delivery shaft 64. This packaging of the converter and the gearing makes it possible to provide improved heat transfer for cooling the hydrokinetic fluid.

Figures 4, 4A:
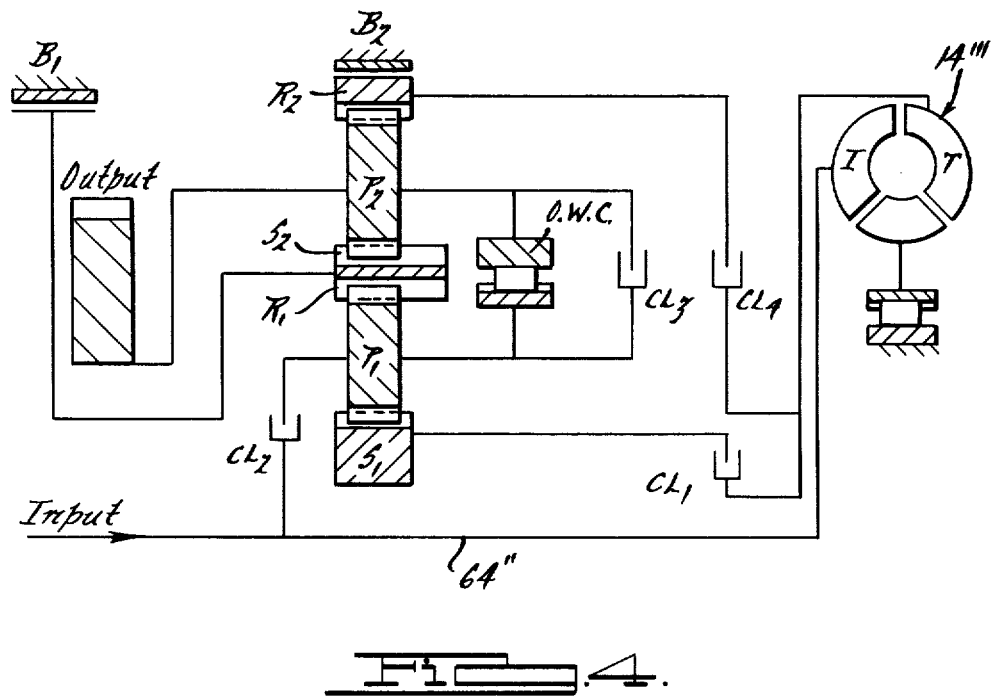
FIG. 4 is a transaxle arrangement of the FIG. 3 embodiment wherein the hydrokinetic unit is located at an outboard location.
FIG. 4A is a chart showing the clutch-and-brake engagement and release pattern for the transmission of FIG. 4.

In FIG. 4 I have illustrated a modification of the gearing shown in FIG. 1 to include a direct mechanical lockup condition in the fourth overdrive ratio. This is achieved by providing a clutch 68, which replaces clutch 48 in the FIG. 1 embodiment. Clutch 68 connects directly the impeller and the engine to the carrier 46 thereby reducing or eliminating the hydrokinetic losses in the converter during those driving conditions in which the clutch 68 is applied. It is applied during direct-drive operation to establish a split torque condition as torque is distributed both hydrokinetically through the clutch 56' and mechanically through the clutch 68. A direct mechanical drive is established during overdrive operation as clutch 68 and clutch 56' are engaged simultaneously, the brake 50' acting as a reaction member.

Figures 3, 3A:
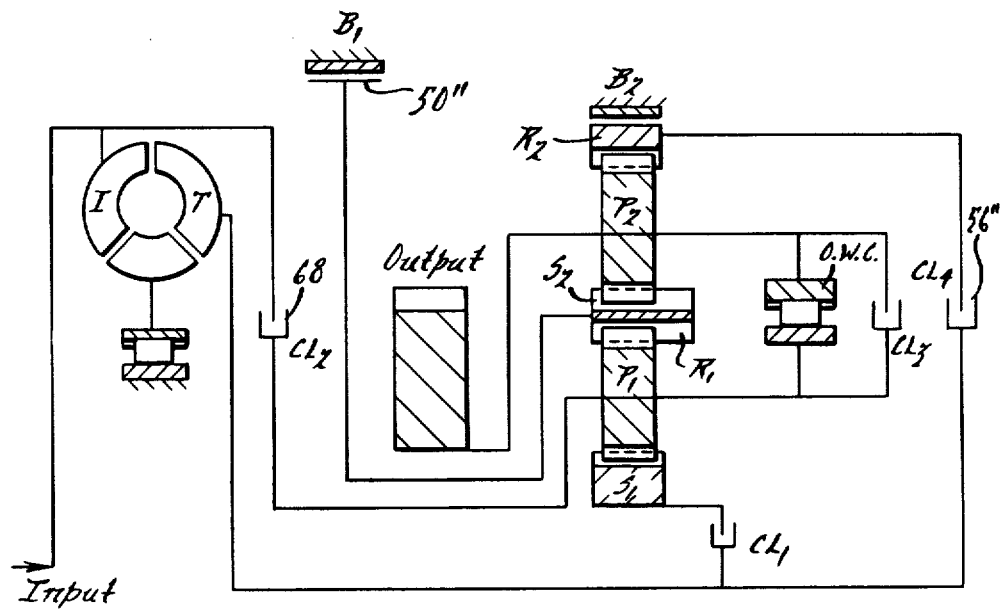
FIG. 3 is a schematic representation of a four speed overdrive transmission of the type shown in FIG. 1 wherein a lockup converter is used to establish a split torque delivery in third gear and a solid mechanical drive in fourth overdrive ratio.
FIG. 3A is a chart showing the clutch-and-brake engagement and release pattern for the transmission of FIG. 3.

The elements of the FIG. 3 embodiment that have a counterpart in FIG. 1 have been illustrated by several reference characters although prime notations are are added. Except for the split torque operation in direct drive and the solid drive fourth ratio operation, the torque flow path through the gear system of FIG. 3 is the same as that described with reference to FIG. 1.

The clutch-and-brake engagement and release pattern for the FIG. 3 embodiment can readily be understood by referring to FIG. 3A.

Figures 2, 2A:
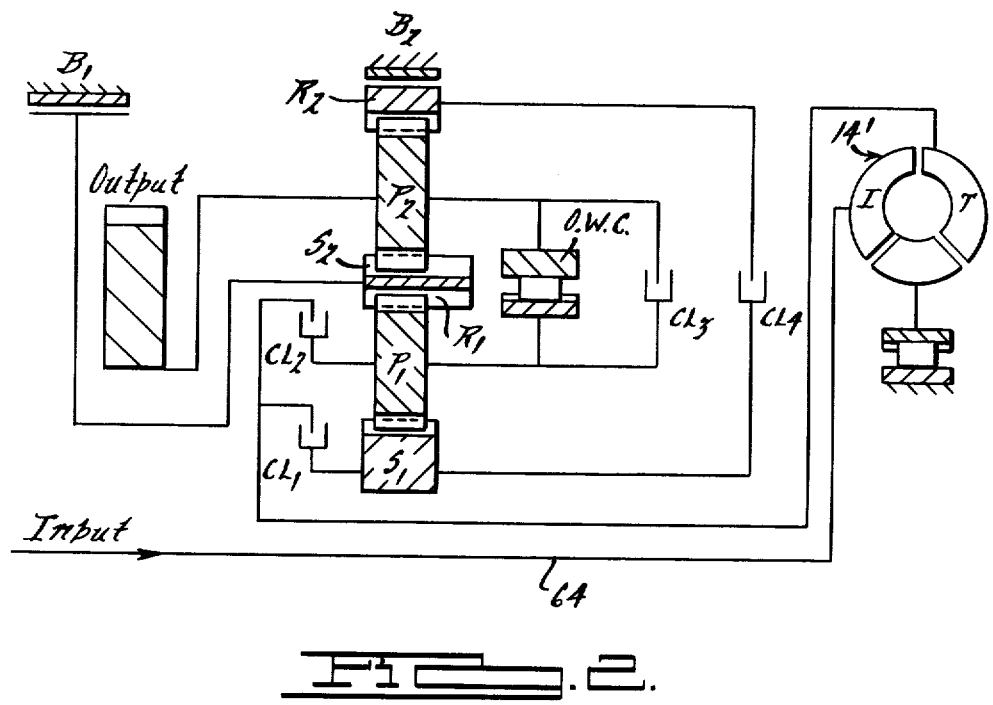
FIG. 2 is an alternate embodiment of the invention wherein the hydrokinetic unit is located at an outboard location which will reduce the amount of heat absorbed from the engine, and which will provide also an oil-to-air heat exchange function to improve hydrokinetic fluid cooling.
FIG. 2A is a chart showing the clutch-and-brake engagement and release pattern for the transmission of FIG. 2.

FIG. 4 is variation of the FIG. 3 embodiment wherein the hydrokinetic converter 14''' is located at an outboard location in a manner similar to the location of the converter 14' of the FIG. 2 embodiment. The engine is connected to the impeller of the FIG. 4 embodiment through a central torque delivery shaft 64'', which passes through the center of the transmission along the axis of the planetary gear elements.

Having described preferred embodiments of our invention, what we claim and desire to secure by U.S. Letters Patent is:

1. A multiple ratio power transmission mechanism comprising a compact planetary gear system and a hydrokinetic torque converter which define a torque delivery path from a torque input member to a torque output member; said gear system comprising planetary gear elements arranged in radially stacked relationship, one with respect to the other, and including also a first sun gear, a first ring gear, first planet pinions engageable with said first sun gear and said first ring gear and journalled rotatably on a first carrier, a second sun gear joined integrally to said first ring gear as part of a common assembly and surrounding said first sun gear, a second ring gear, second planet pinions engageable with second sun gear and said second ring gear and journalled on a second carrier; the hydrokinetic unit including an impeller and a turbine arranged in toroidal flow relationship, said impeller being connected to said torque input member; first clutch means for connecting said turbine to said first sun gear, second clutch means adapted to distribute driving torque to said first carrier, third clutch means for connecting said carriers together for rotation in unison during low speed ratio operation and during reverse drive operation, fourth clutch means for connecting together said first sun gear and said second ring gear during operation in second, third and fourth forward driving ratio; first brake means for selectively anchoring said first ring gear and said second sun gear and second brake means for selectively anchoring said second ring gear, said first brake means being applied during first and second underdrive ratio operation and during fourth ratio operation and said second brake means being applied during reverse drive operation.

2. The combination as set forth in claim 1 wherein said second clutch means comprises a clutch input element and a clutch output element, the latter being connected to said first carrier and the former being connected to said turbine whereby turbine torque is distributed therethrough to said first carrier.

3. The combination as set forth in claim 2 wherein said third clutch means comprises a friction clutch selectively engageable to connect together said carrier and an overrunning coupling adapted to connect together said carriers for torque delivery therebetween in one direction, the friction clutch being selectively engageable for distributing torque between said carriers in each direction.

4. The combination as set forth in claim 1 wherein said second clutch means comprises a torque input clutch element and a torque output clutch element, the torque input clutch element being connected to said impeller and the torque output clutch element being connected to said first carrier whereby said second clutch means distributes torque mechanically from said torque input member to said first carrier when it is engaged thus establishing a split torque delivery path through said transmission mechanism during third speed ratio operation and a solid torque delivery path during overdrive operation as said fourth clutch means and said first brake means are applied simultaneously with engagement of said second clutch means.

* * * * *